United States Patent Office 2,887,480
Patented May 19, 1959

2,887,480

CYANINE BASES CONTAINING AN AZAINDENYL NUCLEUS

Frank G. Webster, Donald W. Heseltine, and Leslie G. S. Brooker, Rochester, N.Y., assignors to Eastman Kodak Company, Rochester, N.Y., a corporation of New Jersey No Drawing. Application July 15, 1957
Serial No. 671,723

6 Claims. (Cl. 260—240)

This invention relates to new cyanine bases containing an azaindenyl nucleus which are useful in spectrally sensitizing photographic silver halide emulsions.

This application is a continuation-in-part of application Serial No. 607,236, filed August 30, 1956.

The new cyanine dye bases of our invention can advantageously be represented by the general formula I.

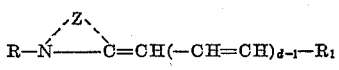

wherein R represents a lower alkyl group, such as methyl, ethyl, etc. (e.g., an alkyl group containing from 1 to 2 carbon atoms), $R_1$ represents a tetrazaindenyl group or a pentazaindenyl group, $d$ represents a positive integer of from 1 to 3 and Z represents the non-metallic atoms necessary to complete a benzothiazole nucleus or a benzoxazole nucleus. The benzene ring of the heterocyclic nucleus defined by Z can contain simple substituents, such as chloro, bromo, methyl, ethyl, methoxyl, ethoxyl, phenyl, etc.

Included among the dyes represented by Formula I above, are the dyes represented by the following general formula:

Ia.
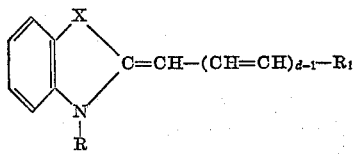

wherein R, $R_1$ and $d$ each have the values given above and X represents an oxygen atom or a sulfur atom.

It is, therefore, an object of our invention to provide new cyanine bases containing an azaindenyl nucleus. Another object is to provide a method of making these cyanine bases. Still another object is to provide photographic silver halide emulsions sensitized with the new cyanine bases of our invention and a method of preparing such sensitized photographic silver halide emulsions. Other objects will become apparent from a consideration of the following description and examples.

By the term "pentazaindenyl group" we mean the group represented by the following formula:

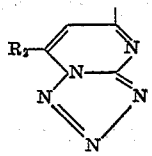

wherein $R_2$ represents a hydrogen atom or a methyl group. By the term "tetrazaindenyl group" we mean the group represented by the following formula:

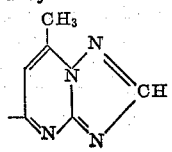

According to our invention, we provide the new cyanine bases of Formula I above by reacting together a cyclammonium quaternary salt selected from those represented by the following general formula:

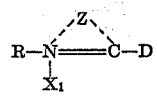

wherein R and Z each have the values given above, $X_1$ represents an acid radical (e.g., chloride, bromide, iodide, thiocyanate, sulfamate, methylsulfate, ethylsulfate, perchlorate, benzenesulfonate, p-toluenesulfonate, etc.) and D represents an alkylthio group (e.g., methylthio, ethylthio, etc.), an arylthio group (e.g., phenylthio, tolylthio, etc.), a β-acylarylaminovinyl group (e.g., β-acetanilidovinyl, β-propionylanilidovinyl, etc.), or a 4-acylarylamino-1,3-butadienyl group (e.g., 4-acetanilido-1,3-butadienyl, 4-propionylanilido-1,3-butadienyl, etc.), with a compound represented by the following general formula:

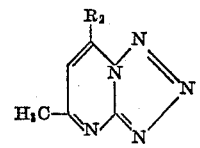

wherein $R_2$ has the values given above, or the compound represented by the following formula:

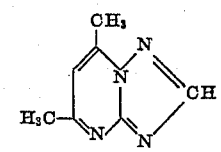

The condensations of our invention can advantageously be accelerated by heating the reaction mixture, generally temperatures varying from ambient temperature (ca. 20° C.) to the reflux temperature of the reaction mixture being satisfactory. The condensations can be carried out in the presence of an inert solvent, such as pyridine, nitrobenzene, ethanol, n-propanol, isopropanol, n-butanol, etc.

The condensations of our invention can also be carried out in the presence of a basic condensing agent, such as the trialkylamines (e.g., triethylamine, tri-n-propylamine, triisopropylamine, tri-n-butylamine, triisobutylamine, tri-n-amylamine, etc.), N-alkylpiperidines (e.g., N-methylpiperidine, N-ethylpiperidine, etc.), N,N-dialkylanilines (e.g., N,N-dimethylaniline, N,N-diethylaniline, etc.), etc.

The following examples will serve to illustrate more fully the manner of preparing the cyanine bases of our invention.

*Example 1.—5-[(3-methyl-2(3H)-benzothiazolylidene)-methyl]-tetrazolo[a]pyrimidine*

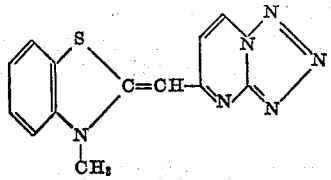

A mixture of 1.35 g. (1 mol.) of 5-methyltetrazolo[a]pyrimidine, 3.67 g. (1 mol.) of 3-methyl-2-methylmercaptobenzothiazolium p-toluene sulfonate, 1.0 g. (1 mol.) of triethylamine and 15 ml. of pyridine was heated at the refluxing temperature for 10 minutes. The reaction mixture was stirred in 100 ml. of methanol, and after chilling the solid was collected on a filter and washed with methanol. The dye was dissolved in hot pyridine, the solution was filtered, methanol was added, and after chilling the dye was collected on a filter and washed with methanol. After another such purification the yield of dye was 29%. The orange plates with a yellow reflex had a M.P. of 279–280° C. with decomposition and they sensitized a photographic gelatino-silver-bromiodide emulsion to about 515 mµ with a maximum sensitivity at about 480 mµ.

*Example 2.—5-[(3-ethyl-2(3H) - benzothiazolylidene)-propenyl]-tetrazolo[a]pyrimidine*

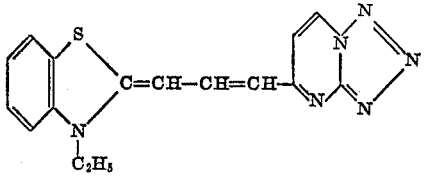

A mixture of 1.35 g. (1 mol.) of 5-methyltetrazolo[a]-pyrimidine, 4.5 g. (1 mol.) of 2-(2-acetanilidovinyl)-3-ethylbenzothiazolium iodide, 1.0 g. (1 mol.) of triethylamine and 15 ml. of pyridine was heated at the refluxing temperature for 5 minutes. The reaction mixture was stirred in 150 ml. of methanol, after chilling the solid was collected on a filter and washed with methanol. The dye was dissolved in pyridine, the solution was filtered, methanol was added, and after chilling the dye was collected on a filter and washed with methanol. After another such purification the yield of dye was 47%. The very dark purplish mat had a M.P. of 187–188° C. with decomposition and it sensitized a photographic gelatino-silver-bromoiodide emulsion to about 685 mµ with maximum sensitivity at about 580 mµ and about 670 mµ.

*Example 3.—5-[(3-ethyl - 2(3H) - benzoxazolylidene)-propenyl]-tetrazolo[a]pyrimidine*

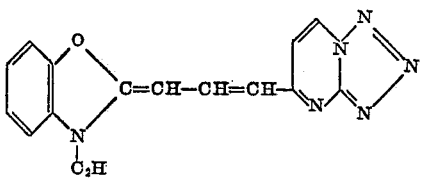

A mixture of 1.35 g. (1 mol.) of 5-methyltetrazolo[a]-pyrimidine, 4.34 g. (1 mol.) of 2-(2-acetanilidovinyl)-3-ethylbenzoxazolium iodide, 1.0 g. (1 mol.) of triethylamine and 20 ml. of pyridine was heated at the refluxing temperature for 10 minutes. The reaction mixture was stirred in 150 ml. of 90% aqueous methanol. After chilling the solid was collected on a filter and washed with a small quantity of cold methanol. The dye was dissolved in hot pyridine, the solution was filtered, methanol was added, and after chilling the dye was collected on a filter and washed with methanol. After another such purification the yield of dye was 23%. The dark blue crystals had a M.P. of 204–205° C. with decomposition and they sensitized a photographic gelatino-silver-bromoiodide emulsion to about 630 mµ with maximum sensitivity at about 570 mµ.

*Example 4.—5-[(3-ethyl-2(3H)-benzothiazolylidene)1,3-pentadienyl]tetrazolo[a]pyrimidine*

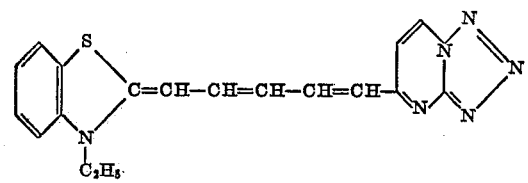

A mixture of 1.35 g. (1 mol.) of 5-methyltetrazolo[a]-pyrimidine, 4.76 g. (1 mol.) of 2-(4-acetanilido-1,3-butadienyl)-3-ethylbenzothiazolium iodide and 20 ml. of pyridine was heated at the refluxing temperature for 5 minutes. The reaction mixture was stirred in 200 ml. of methanol and after chilling the solid was collected on a filter and washed with methanol. The dye was dissolved in hot pyridine, the solution was filtered, methanol was added, and after chilling the solid was collected on a filter and washed with methanol. After another such purification the yield of dye was 12%. The bluish-green crystals had a M.P. of 201–202° C. with decomposition and they sensitized a photographic gelatino-silver-bromoiodide emulsion to about 730 mµ.

*Example 5.—5-[(3-ethyl-2(3H) - benzoxazolylidene)propenyl]-7-methyl-s-triazolo[2,3-a]pyrimidine*

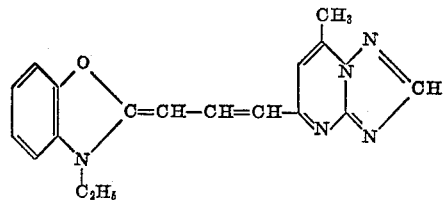

A mixture of 13.02 g (1 mol.) of 2-β-acetanilidovinyl-3-ethylbenzoxazolium iodide, 4.44 g. (1 mol.) of 5,7-dimethyl-s-triazolo[2,3-a]pyrimidine, 50 ml. of absolute ethyl alcohol and 8.08 g. (1 mol. plus 100% excess) of triethylamine was heated at the reflux temperature for 45 minutes. The cool reaction mixture was stirred with cold water and the whole chilled. The product was collected on a filter and washed with water. The yield of dye was 4% crude and 2% after two recrystallizations from methyl alcohol. The dull red crystals had M.P. 212–213° C. with decomposition, and they sensitized a photographic gelatino-silver-bromoiodide emulsion with maximum sensitivity at about 520 mµ.

*Example 6.—5-[(3-ethyl - 2(3H) - benzothiazolylidene)-propenyl]-7-methyl-s-triazolo[2,3-a]pyrimidine*

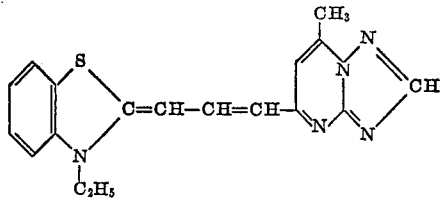

A mixture of 4.5 g. (1 mol) of 2-β-acetanilidovinyl-3-ethylbenzothiazolium iodide, 1.48 g. (1 mol.) of 5,7-dimethyl-s-triazolo[2,3-a]pyrimidine, 20 ml. of absolute ethyl alcohol and 2.02 g. (1 mol. plus 100% excess) of triethylamine was heated at the reflux temperature for 35 minutes. The cool reaction mixture was stirred with cold water and the whole chilled. The product was collected on a filter and washed with methyl alcohol. The yield of dye was 20% crude and 9% after two recrystallizations from methyl alcohol. The brown needles with a blue reflex had M.P. 242–244° C. with decomposition, and they sensitized a photographic gelatino-silver-bromoiodide emulsion with maximum sensitivity at about 570 mµ.

*Example 7.—5-[(3-ethyl-2(3H)-benzothiazolylidene)-propenyl]-7-methyyltetrazolo[a]pyrimidine*

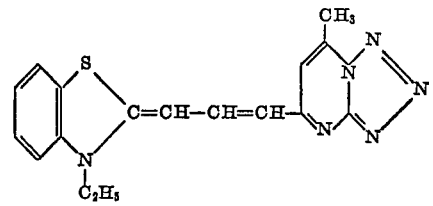

5,7-dimethyltetrazolo[a]pyrimidine (1.49 g., 1 mol.), 2β-acetanilidovinyl-3-ethylbenzothiazolium iodide (4.50 g., 1 mol.) and triethylamine (1.5 ml., 1 mol+10%) were dissolved in ethyl alcohol (15 ml.) and heated under reflux for thirty minutes. After chilling, the crude dye was thrown out of solution by the addition with stirring of water. The aqueous portion was decanted and the residue dissolved in acetone and again precipitated with water. The solid was filtered off and extracted with boiling benzene. The benzene solution of the dye was filtered, concentrated and chilled. The crude dye was then filtered off and dried. After two recrystallizations from ethyl alcohol, the yield of pure dye was 0.20 g. (6%), M.P. 190–191° C. dec.

Analysis, calcd. for $C_{17}H_{16}N_6S$: N, 25.0%. Found: N, 24.7%.

As shown in the above examples, the cyanine bases of our invention are particularly useful in manufacturing photographic silver halide emulsions, serving to alter the sensitivity thereof. Sensitization by means of our new bases is, of course, directed primarily to the ordinarily employed, gelatino-silver-halide, developing-out emulsions. The bases are advantageously incorporated in the washed, finished emulsion and should, of course, be uniformly distributed throughout the emulsion. In the preparation of photographic emulsions containing our new bases, it is only necessary to disperse the bases in the emulsions. The methods of incorporating bases in emulsions are simple and well known to those skilled in the art of emulsion making. It is convenient to add the bases from solutions in appropriate solvents. The solvent must, of course, be compatible with the emulsion and substantially free from any deleterious effect on the light-sensitive materials. Pyridine (or warm methanol) has proven satisfactory as a solvent for the majority of our new bases.

The concentration of our new bases in the emulsion can vary widely, i.e., from about 5 to about 100 mgs. per liter of flowable emulsion. The concentration of the base will vary according to the type of light-sensitive material in the emulsion and according to the effects desired. The suitable and most economical concentration for any given emulsion will be apparent to those skilled in the art upon making the ordinary tests and observations customarily used in the art of emulsion making.

To prepare a gelatino-silver-halide emulsion sensitized with one of our new bases, the following procedure is satisfactory: A quantity of the base is dissolved in pyridine or other suitable solvent and a volume of this solution (which may be diluted with methanol) containing from 5 to 100 mgs. of base is slowly added to about 1000 cc. of a gelatino-silver-halide emulsion, with stirring. Stirring is continued until the base is uniformly distributed throughout the emulsion. With most of our new bases, 10 to 20 mgs. of dye per liter of emulsion suffices to produce the maximum sensitizing effect with the ordinary gelatino-silver-bromide (including bromiodide) emulsions. With fine-grain emulsions, which include most of the ordinarily employed gelatino-silver-chloride emulsions, somewhat larger concentrations of base may be necessary to secure the optimum sensitizing effect.

The above statements are only illustrative and are not to be understood as limiting our invention in any sense, as it will be apparent that our new bases can be incorporated by other methods in many of the photographic silver halide emulsions customarily employed in the art. For instance, the bases can be incorporated by bathing a plate or film upon which an emulsion has been coated, in the solution of the base, in an appropriate solvent. Bathing methods, however, are not to be preferred ordinarily.

Photographic silver halide emulsions which can advantageously be sensitized by means of the new bases of our invention comprise the customarily employed gelatino-silver-chloride, gelatino-silver-chlorobromide, gelatino-silver-bromide, and gelatino-silver-bromiodide developing-out emulsions.

Photographic silver halide emulsions, such as those listed above, containing the sensitizing dye bases of our invention can also contain such addenda as chemical sensitizers, e.g., sulfur sensitizers (e.g., allyl thiocarbamide, thiourea, allylisothiocyanate, cystine, etc.), various gold compounds (e.g., potassium chloroaurate, auric trichloride, etc.) (see U.S. Patents 2,540,085; 2,597,856 and 2,597,915), various palladium compounds, such as palladium chloride (U.S. 2,540,086), potassium chloropalladate (U.S. 2,598,079), etc., or mixtures of such sensitizers; anti-foggants, such as ammonium chloroplatinate (U.S. 2,566,245), ammonium chloroplatinite (U.S. 2,566,263), benzotriazole, nitrobenzimidazole, 5-nitroindazole, benzidine, mercaptans, etc. (see Mees—"The Theory of the Photographic Process," Macmillan Pub., page 460), or mixtures thereof; hardeners, such as formaldehyde (U.S. 1,763,533), chrome alum (U.S. 1,763,533), glyoxal (U.S. 1,870,354), dibromacrolein (Br. 406,750), etc.; color couplers, such as those described in U.S. Patent 2,423,730, Spence and Carroll U.S. Patent 2,640,776, etc.; or mixtures of such addenda. Dispersing agents for color couplers, such as those set forth in U.S. Patents 2,322,027 and 2,304,940, can also be employed in the above-described emulsions.

The cyanine bases of our invention represented by Formula I above can be quaternated by heating with an alkyl salt, such as ethyl-p-toluenesulfonate, to provide cyanine dyes. However, we have found that several dyes prepared in this manner, and in particular the dyes containing a tetrazaindenyl nucleus, do not have as useful a sensitizing action as the corresponding cyanine bases. In several instances, this difference is quite marked. Dyes corresponding to the cyanine bases of Formulas I or II above, wherein $R_1$ represents a tetrazaindenyl group have been previously described in U.S. Patents 2,439,210, dated April 6, 1948 and 2,443,136, dated June 8, 1948. As indicated above, the cyanine bases have considerably higher speeds than the corresponding dyes.

The following examples will serve to illustrate the method of preparing certain of the azaindenyl intermediates useful in practicing our invention.

*Example 8.—5,7-dimethyltetrazolo[a]pyrimidine*

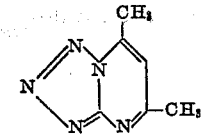

5-aminotetrazole (21 g., 1 mol.), 2,4-pentanedione (25 g., 1 mol.) and piperidine (5 ml.) were dissolved in ethyl alcohol (150 ml.) and heated under reflux for sixteen hours. The reaction mixture was then concentrated to dryness and the product extracted with hot ligroin (90°–120° C.). The product crystallized from the chilled ligroin solution and was filtered off and dried. The yield of recrystallized product was 15 g. (40%), M.P. 148–150° C.

*Example 9.—5-methyltetrazolo[a]pyrimidine or 6-methyl-1,2,3,3a,7-pentazaindene*

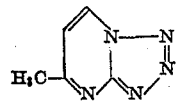

A mixture of 15.5 g. of 4,4-dimethoxy-2-butanone and 8.6 g. of 5-aminotetrazole in a solution of 100 ml. of xylene and 15 ml. of N,N-dimethylformamide was heated under a suitable fractionating column, and the methanol-water distillate was removed as formed. The reaction was continued until no more distillate came over, and the resulting solution was treated with decolorizing carbon and filtered. A 76% yield of the desired pentazaindene compound was obtained. Recrystallization of the product from ethanol produced nearly colorless crystals having a melting point of 134° C.

Calcd. for $C_5H_5N_5$: C, 44.4; H, 3.7; N, 51.8. Found: C, 44.5; H, 3.4; N, 51.3.

What we claim as our invention and desire secured by Letters Patent of the United States is:

1. A cyanine base selected from the group consisting of those represented by the following two general formulas:

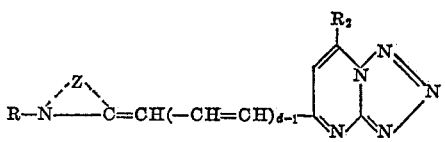

and

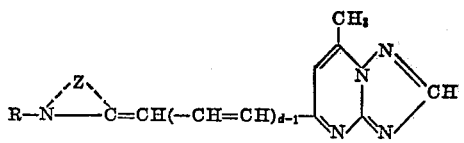

wherein R represents a lower alkyl group, $R_2$ represents a member selected from the group consisting of a hydrogen atom and a methyl group, Z represents the non-metallic atoms necessary to complete a heterocyclic nucleus selected from the group consisting of a benzoxazole nucleus and a benzothiazole nucleus, and $d$ represents a positive integer from from 1 to 3.

2. The cyanine base represented by the following formula:

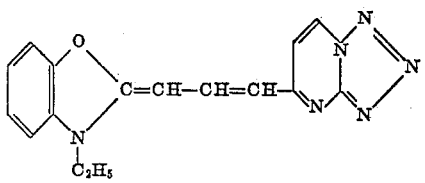

3. The cyanine base represented by the following formula:

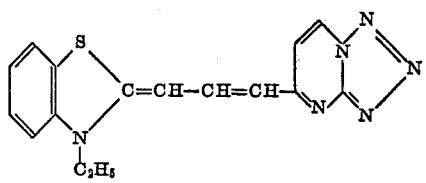

4. The cyanine base represented by the following formula:

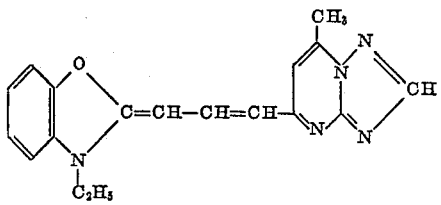

5. The cyanine base represented by the following formula:

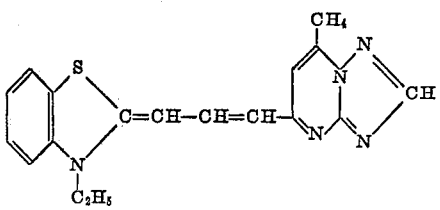

6. The cyanine base represented by the following formula:

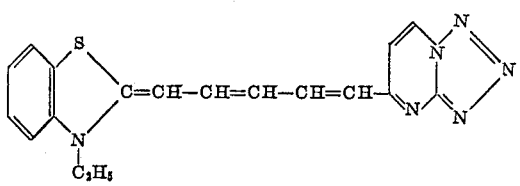

References Cited in the file of this patent
UNITED STATES PATENTS

| | | |
|---|---|---|
| 2,439,210 | Heimbach | Apr. 6, 1948 |
| 2,443,136 | Heimbach | June 8, 1948 |

UNITED STATES PATENT OFFICE
Certificate of Correction

Patent No. 2,887,480                                                           May 19, 1959

Frank G. Webster et al.

It is hereby certified that error appears in the printed specification of the above numbered patent requiring correction and that the said Letters Patent should read as corrected below.

Column 1, line 21, after "by the" insert —following—; column 4, line 61, heading of Example 7, for "-*methyyltetrazolo[a]pyrimidine*" read — -*methyltetrazolo[a]pyrimidine*—; column 5, line 11, for the indistinct matter read —N, 24.7%.—; column 7, line 25, for "from", first occurrence, read —of—; column 8, lines 14 to 22 inclusive, the formula should appear as shown below instead of as in the patent:

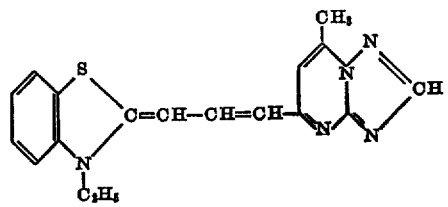

Signed and sealed this 20th day of October 1959.

[SEAL]

Attest:
KARL H. AXLINE,
*Attesting Officer.*

ROBERT C. WATSON,
*Commissioner of Patents.*